United States Patent
Gauthier et al.

(10) Patent No.: US 9,541,013 B2
(45) Date of Patent: Jan. 10, 2017

(54) METHOD AND SYSTEM FOR LIMITING BELT SLIP IN A CONTINUOUSLY VARIABLE TRANSMISSION

(71) Applicant: BOMBARDIER RECREATIONAL PRODUCTS INC., Valcourt (CA)

(72) Inventors: Jean-Philippe Gauthier, Sherbrooke (CA); Roger Rioux, Sherbrooke (CA); Maxime Desjardins-Goulet, Sherbrooke (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 0 days.

(21) Appl. No.: 14/744,801

(22) Filed: Jun. 19, 2015

(65) Prior Publication Data
US 2015/0284003 A1 Oct. 8, 2015

Related U.S. Application Data

(63) Continuation of application No. PCT/US2012/071241, filed on Dec. 21, 2012.

(51) Int. Cl.

| | |
|---|---|
| *B60W 10/06* | (2006.01) |
| *B60W 10/107* | (2012.01) |
| *B60W 10/11* | (2012.01) |
| *F02D 29/02* | (2006.01) |
| *F16H 61/662* | (2006.01) |
| *F02D 41/02* | (2006.01) |
| *F02D 37/02* | (2006.01) |
| *F02P 5/15* | (2006.01) |

(52) U.S. Cl.
CPC ............ *F02D 29/02* (2013.01); *F02D 37/02* (2013.01); *F02D 41/0215* (2013.01); *F16H 61/66272* (2013.01); *F02D 2250/18* (2013.01); *F02D 2400/12* (2013.01); *F02P 5/1512* (2013.01); *Y02T 10/42* (2013.01)

(58) Field of Classification Search
None
See application file for complete search history.

(56) References Cited

U.S. PATENT DOCUMENTS

| | | |
|---|---|---|
| 6,188,944 B1 | 2/2001 | Kolmanovsky et al. |
| 6,427,109 B1 | 7/2002 | Doering et al. |
| 7,029,410 B2 | 4/2006 | Sawada et al. |
| 7,438,147 B2 | 10/2008 | Kato et al. |
| 2004/0209732 A1 | 10/2004 | Eguchi et al. |

(Continued)

OTHER PUBLICATIONS

International Search Report of PCT/US2012/071241; Blaine R. Copenheaver; Feb. 25, 2013.

*Primary Examiner* — Edwin A Young
(74) *Attorney, Agent, or Firm* — BCF LLP (57) ABSTRACT

A method of limiting belt slip in a continuously variable transmission (CVT) of a vehicle. The CVT is operatively connected to an engine. The method includes determining a slip speed of a belt of the CVT, determining the accumulated energy based on the slip speed of the belt and an engine torque produced by the engine, and controlling the engine torque in an intervention mode when the accumulated energy is greater than a threshold energy. Controlling the engine torque in the intervention mode comprises controlling at least one of cycling the engine torque, and limiting the engine torque. Systems and vehicles for performing the method are also disclosed.

21 Claims, 6 Drawing Sheets

(56) References Cited

U.S. PATENT DOCUMENTS

| | | |
|---|---|---|
| 2006/0183581 A1 | 8/2006 | Iwatsuki et al. |
| 2010/0168954 A1 | 7/2010 | Inoue et al. |
| 2012/0108373 A1* | 5/2012 | Doihara ............ F16H 61/66272 474/28 |
| 2012/0209495 A1* | 8/2012 | Sakai .................... B60K 6/485 701/102 |
| 2012/0252612 A1 | 10/2012 | Kodama et al. |

* cited by examiner

METHOD AND SYSTEM FOR LIMITING BELT SLIP IN A CONTINUOUSLY VARIABLE TRANSMISSION

CROSS-REFERENCE

The present application is a continuation of International Patent Application No. PCT/US2012/071241, filed on Dec. 21, 2012, the entirety of which is incorporated herein by reference.

FIELD OF THE INVENTION

The present invention relates generally to methods and systems for limiting belt slip in a continuously variable transmission.

BACKGROUND

Continuously variable transmissions (CVTs), comprising a drive pulley and a driven pulley connected by an endless belt, are used in many kinds of wheeled and tracked vehicles to transfer power from the engine to the wheels or tracks of the vehicle. The maximum torque produced by the engine depends on the engine speed, generally being higher for lower engine speeds. The torque required by the wheels or tracks increases with the load on the vehicle. For example, torque required to move the vehicle is larger when going uphill or when starting from a stationary position.

Each pulley has a pair of opposing sheaves (at least one of which is moveable) holding the belt between them. The opposing pulley sheaves exert a clamping force on the belt to keep the belt engaged so that the rotational motion of the drive pulley can be transmitted to the driven pulley. The clamping force exerted on the belt by the drive pulley sheaves is determined by several factors. In a purely mechanical CVT, the clamping force is generated by a set of rotating flyweights connected to one of the drive pulley sheaves. The clamping force therefore increases with the rotational speed of the drive pulley. The clamping force exerted on the belt thus also depends on the engine torque. Although the flyweight mass and/or the rotational speed of the pulley can be increased to obtain larger clamping forces, these parameters can only be changed within certain limits without affecting the overall performance of the vehicle. In some types of assisted CVTs, the clamping force is controlled by a hydraulic, electric or pneumatic system selectively exerting an external force on the drive pulley sheaves. In these assisted CVTs, the size of the assisting systems, and therefore the clamping force produced thereby, is limited due to space limitations.

Whatever the mechanism may be for producing the clamping force on the belt, a minimum amount of clamping force is required to prevent the belt from slipping with respect to the drive pulley sheaves. When the clamping force exerted on the belt is smaller than the minimum clamping force required, the belt begins to slip with respect to the drive pulley sheaves. The belt moving against the pulley sheaves generates a significant amount of heat, which could potentially lead to "spotting" of the belt when certain spots on the surface of the belt (primarily made of rubber), especially in those portions of the belt which are in contact with the drive pulley sheaves melt, from the excessive heat. A belt having such "spots" cannot operate smoothly as it is no longer uniform and will thus need to be replaced.

Furthermore, as the belt begins to slip, and the vehicle begins to slow down or is unable to start, the driver of the vehicle sometimes responds by further increasing the throttle, causing the drive pulley sheaves to rotate faster, further increasing the amount of heat generated by the belt rubbing against the pulley sheaves and thereby exacerbating the situation. Thus, such a response to the belt slipping could actually increase the chances of spotting of the belt.

There is thus a need for a system and method to limit slipping of the CVT belt, and to prevent the slipping belt from being damaged.

SUMMARY

It is an object of the present invention to ameliorate at least some of the inconveniences present in the prior art.

In one aspect, the present provides a method of limiting belt slip in a continuously variable transmission (CVT) of a vehicle, the CVT being operatively connected to an engine. The method includes determining a slip speed of a belt of the CVT, determining the accumulated energy based on the slip speed of the belt and an engine torque produced by the engine, and controlling the engine torque in an intervention mode when the accumulated energy is greater than a threshold energy. Controlling the engine torque in the intervention mode comprises controlling at least one of cycling the engine torque, and limiting the engine torque.

In a further aspect, the method includes determining if the belt of the CVT is slipping with respect to a drive pulley of the CVT before determining the accumulated energy.

In a further aspect, the CVT belt is determined to be slipping if: a vehicle speed is less than a threshold vehicle speed, a transmission of the vehicle is configured to be in a high gear, and a throttle actuator of the vehicle is set in a throttle actuator position greater than a threshold throttle actuator position.

In another aspect, the accumulated energy is reset to zero if a vehicle speed is greater than a threshold vehicle speed.

In an additional aspect, the accumulated energy is reset to zero if a transmission of the vehicle is configured to be in a low gear.

In another aspect, the accumulated energy is reset to zero if a throttle actuator of the vehicle is set in a throttle actuator position lower than a threshold throttle actuator position.

In a further aspect, controlling the engine torque in the intervention mode comprises controlling the engine torque based on a throttle actuator position set by a driver of the vehicle. In some embodiments, controlling the engine torque in the intervention mode includes cycling the engine torque if the throttle actuator position set by the driver is greater than a first threshold throttle actuator position and limiting the engine torque if the throttle actuator position set by the driver is greater than a second threshold throttle actuator position. The engine torque is cycled to oscillate with respect to an average engine torque, the average engine torque being based on the throttle actuator position. The second threshold throttle actuator position being greater than the first threshold throttle actuator position.

In another aspect, the first threshold throttle actuator position is preset to be at a value of 5% of a maximum throttle actuator position.

In another aspect, the second threshold throttle actuator position is preset to be at a value of 50% of a maximum throttle actuator position.

In yet another aspect, controlling the engine torque in the intervention mode includes cycling the engine torque so as to oscillate about a demanded torque, the amplitude of oscillations being adapted to produce rocking motion of the vehicle.

In an additional aspect, a rate of increase of an average engine torque is reduced if a throttle actuator position is greater than the first threshold throttle actuator position.

In a further aspect, limiting the engine torque includes at least one of limiting air intake into the engine and limiting fuel injection into the engine.

In another aspect, cycling the engine torque includes cycling an ignition timing of the engine.

In an additional aspect, controlling the engine torque in the intervention mode further includes displaying to the driver of the vehicle at least one of an indication of the CVT belt slipping and an instruction for making a gear change.

In another aspect, the method includes stopping controlling the engine torque in the intervention mode if a vehicle speed is greater than a threshold vehicle speed.

In another aspect, the method includes stopping controlling the engine torque in the intervention mode if a throttle actuator is set at a position below a threshold throttle actuator position.

In yet another aspect, the method includes stopping controlling the engine torque in the intervention mode if a throttle actuator is set at a position below a threshold throttle actuator position for a time period at least equal to a threshold throttle actuator time.

In another aspect, the method includes stopping controlling the engine torque in the intervention mode if an intervention override switch is actuated.

In another aspect, the present provides a method of limiting belt slip in a continuously variable transmission (CVT) of a vehicle, the CVT being operatively connected to an engine. The method includes determining a slip speed of a belt of the CVT, determining the accumulated energy based on the slip speed of the belt and an engine torque produced by the engine, and controlling the engine torque in an intervention mode when the accumulated energy is greater than a threshold energy. Controlling the engine torque in the intervention mode includes cycling the engine torque if the throttle actuator position set at a position greater than a first threshold throttle actuator position and limiting the engine torque if the throttle actuator is set at a position greater than a second threshold throttle actuator position. The engine torque is cycled to oscillate with respect to an average engine torque, the average engine torque being based on the throttle actuator position. The second threshold throttle actuator position is greater than the first threshold throttle actuator position. The method also includes stopping controlling the engine torque in the intervention mode if a vehicle speed is greater than a threshold vehicle speed of if the throttle actuator of the vehicle is set at a position lower than the first threshold throttle actuator position.

In another aspect, the present provides a vehicle having a frame and an engine supported by the frame. The engine includes a throttle valve for controlling air intake into the engine, a fuel injector for controlling fuel injection into the engine, and a spark plug. The vehicle also includes a control unit connected to the engine for controlling an engine torque produced by the engine and a throttle actuator connected to the throttle valve and movable between a plurality of throttle actuator positions. The throttle actuator is connected to the control unit and sending to the control unit a throttle actuator position signal indicative of a position of the throttle actuator. Also included in the vehicle is a driving shaft operatively connected to the engine and a continuously variable transmission (CVT) having a drive pulley connected to the driving shaft and rotating therewith, a driven pulley, and a belt connecting the drive pulley and the driven pulley. A driven shaft is connected to driven pulley and rotating therewith. A ground engaging member is operatively connected to the driven shaft. A transmission is operatively connecting the CVT to the ground-engaging member via a plurality of gears. A gear selector is connected to the transmission for selecting one of the plurality of gears of the transmission, the gear selector being connected to the control unit and sending a gear selection signal thereto indicative of the selected gear. A vehicle speed sensor sensing a rotational speed of one of: the driven pulley, the ground engaging member, and an element connected between the driven pulley and the ground engaging member. The vehicle speed sensor is connected to the control unit for sending a vehicle speed signal thereto indicative of a vehicle speed. The control unit determines the vehicle speed and a driven pulley speed based at least in part on the vehicle speed signal. An engine speed sensor senses a rotational speed of one of: the engine, the drive pulley, and an element connected between the engine and the drive pulley. The engine speed sensor is connected to the control unit for sending a engine speed signal thereto indicative of an engine speed. The control unit determines the engine speed, an engine torque and a drive pulley speed based at least in part on the engine speed signal. The control unit controls the engine torque in an intervention mode when the belt of the CVT is slipping with respect to the drive pulley. The control unit controls the engine torque in the intervention mode based on the engine speed signal, the vehicle speed signal, the throttle actuator position signal and the gear selection signal. The control unit controls the engine torque in the intervention mode by cycling the engine torque so as to oscillate the engine torque about a demanded torque. An amplitude of engine torque oscillations is adapted to produce rocking motion of the vehicle. The control unit controls the engine torque in the intervention mode by performing at least one of cycling an ignition timing, limiting air intake into the engine, and limiting fuel injection into the engine. The control unit controls the engine torque in the intervention mode by sending at least one of an ignition timing signal to the spark plug, a throttle valve control signal to the throttle valve, and a fuel injection control signal to the fuel injector.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted).

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Embodiments of the present invention will be described with respect to a side-by-side vehicle (SSV). However, it is contemplated that aspects of the embodiments of the present invention could also be used on other wheeled or tracked vehicles including continuously variable transmissions (CVTs), such as snowmobiles, motorcycles, all-terrain vehicles, and the like.

Figure 1:
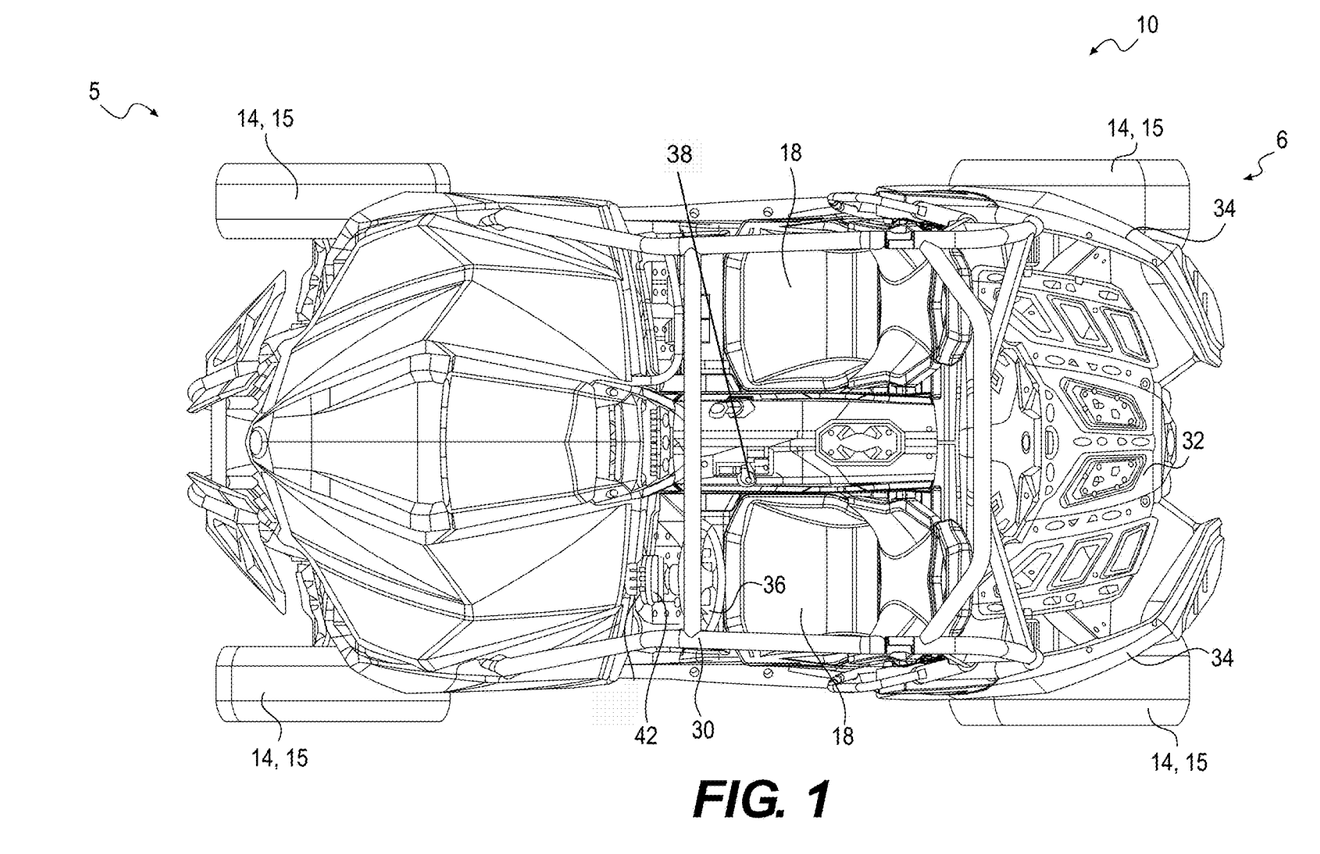
FIG. 1 is a top plan view of a side-by-side vehicle (SSV)

FIG. 1 illustrates an SSV 10 having a front end 5 and a rear end 6. The SSV 10 includes a frame 12 to which a vehicle body is mounted. A pair of front wheels 14 is suspended from the front portion of the frame 12 via front suspensions 13A. A pair of rear wheels 14 is suspended from the rear portion of the frame 12 via rear suspensions 13B. Each of the four wheels 14 has a tire 15. It is also contemplated that the SSV 10 could have six or more wheels.

A cockpit area 22 is disposed in the middle portion of the frame 12. The cockpit area 22 comprises two seats 18 mounted laterally beside each other to the frame 12 to accommodate a driver and a passenger (riders) of the SSV 10 respectively. The cockpit area 22 is open at the two lateral sides 7 of the SSV 10, forming two lateral passages 24 through which the riders can ingress and egress the SSV 10. A lateral cover (not shown), selectively disposed across each lateral passage 24, can be opened to clear the lateral passage 24 for egress or ingress. A roll cage 30 is connected to the frame 12 and disposed above the cockpit area 22. A cargo rack 32 disposed rearward of the seats 18 is surrounded in part by two side body panels 34.

An internal combustion engine 29 (FIG. 2) is mounted to the middle portion of frame 12 between the seats 18. A console 23, positioned between seats 18 covers the engine 29 and separates the engine 29 from the driver and the passenger. The console 23 defines in part a central cooling tunnel allowing air to flow from the front end 5 of the vehicle 10 to the rear end 6 of the vehicle to cool the engine 29.

A steering assembly including a steering wheel 36 is disposed in front of the driver seat 18. The steering assembly is operatively connected to the two front wheels 14 to permit steering of the SSV 10. Steering devices, other than a steering wheel, are also contemplated, for example a steering handle.

A gear selector handle 38, located between the driver and passenger seats and configured to be disposed in positions P, N, R, L, H, respectively corresponding to a parking, neutral, reverse, low and high gears, allows the driver of the SSV 10 to make a gear selection. It is contemplated that the sequence of gears could be different. The gear selector handle 38 is connected to the transmission 116 for effecting the gear selection.

A throttle pedal 40 (FIG. 2) is located in front of the driver seat 18, above a floor of the cockpit area 22, below the steering wheel 36. The driver of the SSV can press on the throttle pedal 40 to increase the power delivered by the engine 29. Air intake into the engine 29 is controlled partly based on the position of the throttle pedal 40. It is contemplated that the vehicle 10 could be provided with other types of throttle controls, for example, a throttle lever that can be operated by the hand.

One or more display gauges 42, disposed in front of the driver seat 18, display information such as vehicle speed, engine speed, engine temperature, and the like to the driver and/or passenger of the SSV 10.

An intervention override switch 44 (FIG. 4) is provided which can be actuated by the driver of the SSV 10 to override an intervention as will be described below in further detail. The intervention override switch 44 is in the form of a push-button, but it is contemplated that it could be a switch, knob or other user control.

Figure 2:
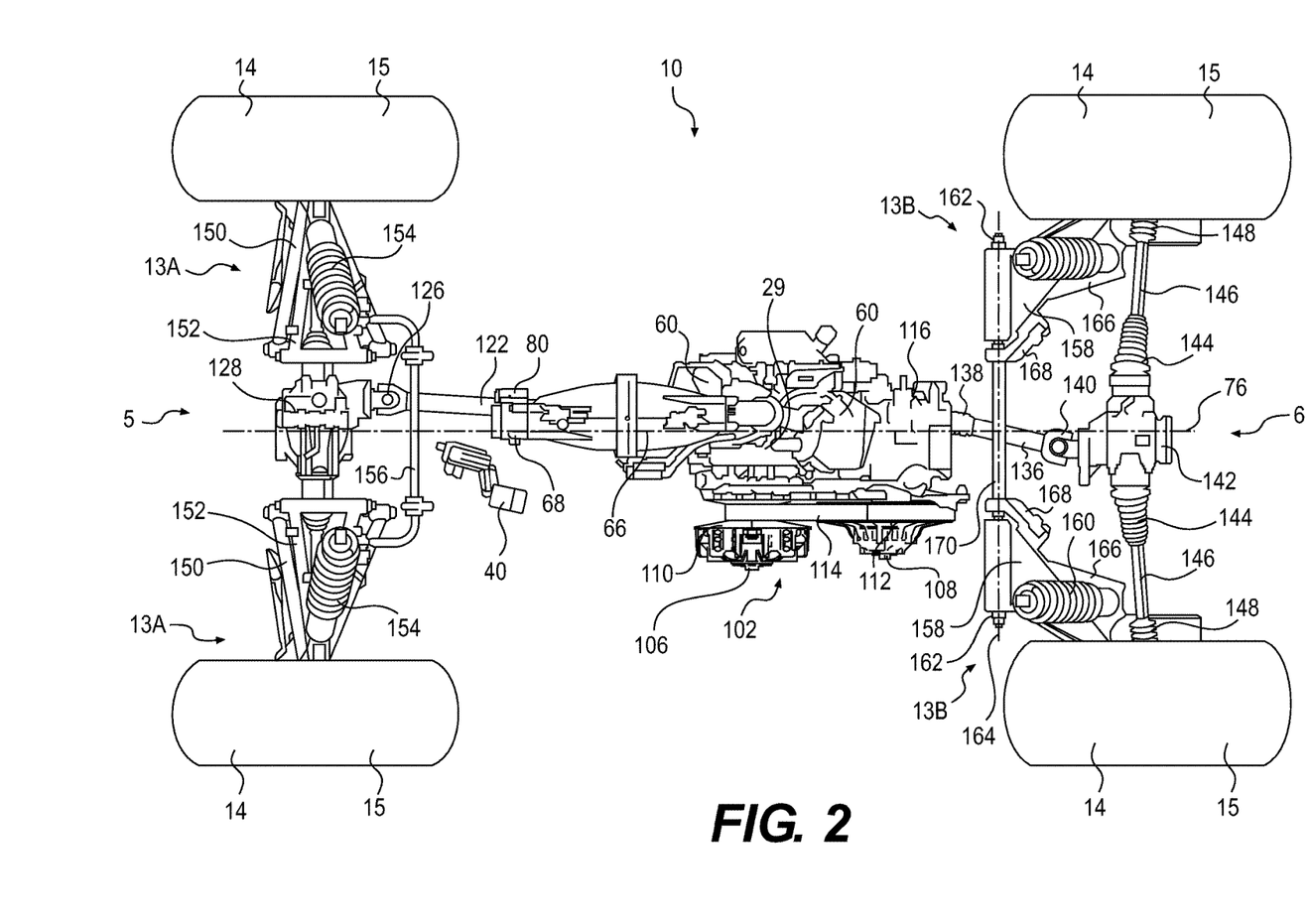
FIG. 2 is a top plan view of a power train of the SSV of FIG. 1.
Figure 3:
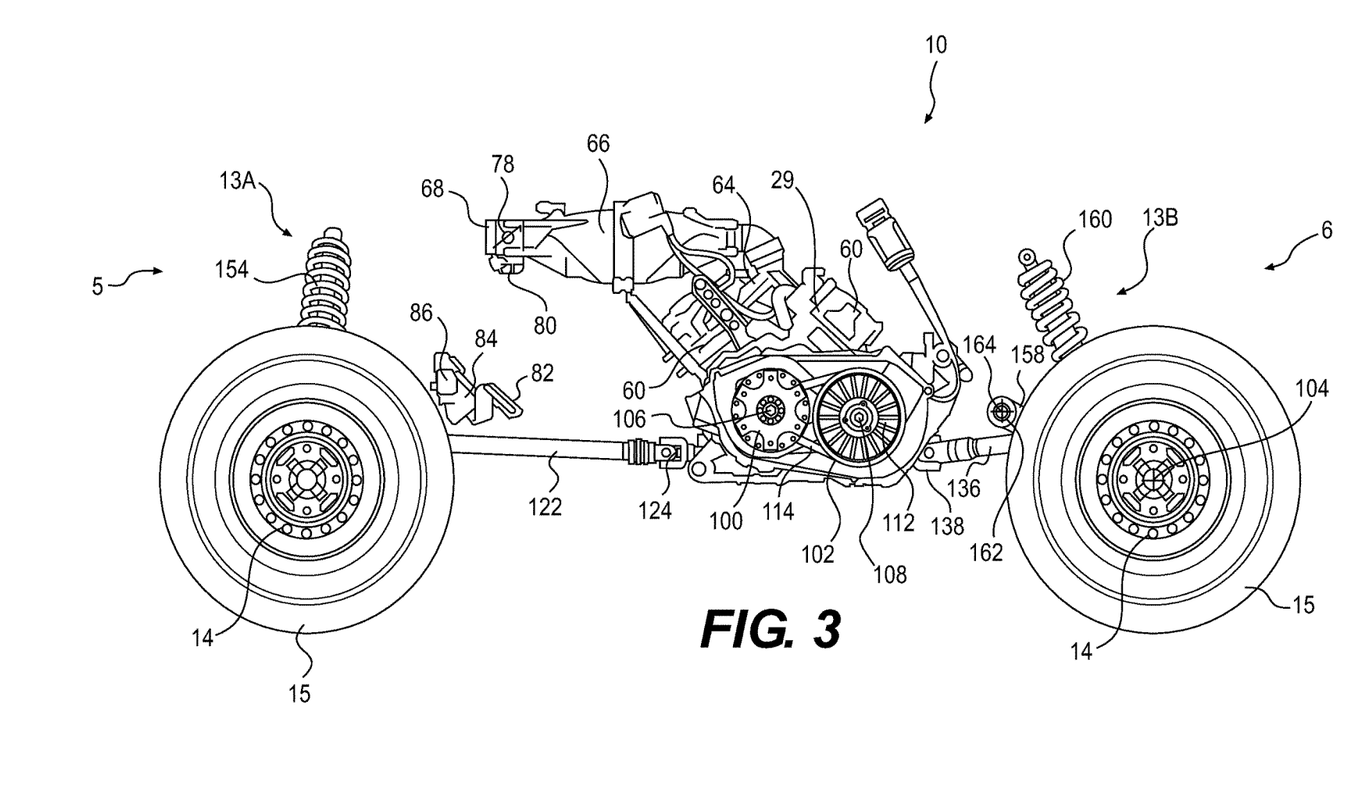
FIG. 3 is a left side elevation view of the power train of FIG. 2.

With reference to FIGS. 2 and 3, the power train of the SSV 10 includes the engine 29, a continuously variably transmission (CVT) 102 and a transmission 116.

In the illustrated embodiment of the SSV 10, the engine 29 is a V-type engine having two cylinders 60. The cylinders 60 are disposed at an angle to each other. Each cylinder 60 has an intake port (not shown) connected to an air induction system delivering air into the engine 29. Each cylinder 60 has a fuel injector 206 (FIG. 4) injecting fuel into the engine 29 and a spark plug 204 (FIG. 4) igniting the fuel-air mixture to initiate the combustion cycle. Each cylinder 60 has an exhaust port (not shown) connected to an exhaust manifold (not shown) through which the exhaust gases are removed from the engine 29. The engine 29 is connected to a control unit 88 for controlling operation of the engine 29. It is contemplated that other types of internal combustion engine could be used, such as, for example, an inline engine. It is also contemplated that the engine 29 could have more than two cylinders 60.

The air induction system includes an intake manifold 64, a plenum chamber 66 connected upstream of the intake manifold 64 and a throttle body 68 connected upstream of the intake conduit 66. When the engine 29 is operating, air flows sequentially through the throttle body 68, the plenum chamber 66, the intake manifold 64 and then through the intake ports into the cylinders 60 of the engine 29. The intake manifold 64 separates the flow of air from the intake conduit 66 into two branches, each of the branches being connected to an air intake port of a corresponding cylinder 60, 62 of the engine 29. The plenum chamber 66 equalizes the pressure of air entering the cylinders 60 and also acts as an acoustic silencer to dampen the noise generated by the engine 29.

The throttle body 68 regulates the flow of air to the engine 29. The throttle body 68 includes a throttle plate 78 (schematically shown in FIG. 2). Adjusting the position of the throttle plate 78 inside the throttle body 68 regulates air flow through the throttle body 68 to the engine 29. An electric motor 80 is mounted to a right side of the throttle body 68. The electric motor 80 is operatively connected to the throttle plate 78 to pivot the throttle plate 78 inside the throttle body 68.

The electric motor 80 positions the throttle plate 78 based at least in part on a position TP of the throttle pedal 40 of the vehicle 10. A throttle pedal position sensor 86 senses a position of the throttle pedal 40 and sends a throttle pedal position signal representative of this position to a control unit 88. The control unit 88 sends a signal to the electric motor 80 to adjust an opening of the throttle plate 78 of the throttle body 68. A throttle plate sensor 90 senses the position of the throttle plate in the throttle body and sends a throttle plate position signal representative of this position to the control unit 88.

Engine power, torque and engine speed are determined in part by the fuel-air mixture in the engine 29 and the ignition timing. The control unit 88 therefore regulates fuel injection into the engine 29 as well as the ignition timing by controlling operation of the fuel injectors 206 and the spark plug 206.

The engine 29 drives the wheels 14 via the CVT 102 and the transmission 116.

The CVT 102 is disposed on a left side of the engine 29. The CVT 102 includes a drive pulley 110 disposed on a crankshaft 106 of the engine 29, a driven pulley 112 disposed on a driven shaft 108 for rotation therewith, and a CVT belt 114 disposed around both pulleys 110, 112 to transmit torque from the drive pulley 110 to the driven pulley 112. A cover 100 (FIG. 3) disposed over the CVT 102 is connected to both the engine 29 and the transmission 116.

Each of the pulleys 110, 112 includes a movable sheave that can move axially relative to a fixed sheave to modify an effective diameter of the corresponding pulley 110, 112. The sheaves move in response to changes in engine speed and torque requirement of the wheels. The effective diameters of the pulleys 110, 112 are in inverse relationship. In the illustrated embodiment, the CVT 102 is a purely mechanical CVT 102, in which the diameter of the drive pulley 110 increases with increasing rotational speed of the drive pulley 110 (i.e. with increasing engine speed). The diameter of the driven pulley 112 therefore decreases when the torque required at the driven shaft 108 (connected to the wheels 14) increases. The belt 114 can occasionally slip with respect to the drive pulley 110 when the torque requirement of the wheels 14 increases (for example due to acceleration or a heavy load) and the clamping force of the drive pulley sheaves, on the belt 114, is insufficient. When belt slipping occurs, the engine 29 is operated in an intervention mode to control the engine torque as described below in order to limit belt slippage. It is also contemplated that the CVT 102 could be an assisted CVT having a hydraulic, pneumatic, or other system to control the effective diameter of the pulleys 110 or 112.

The transmission 116 is disposed rearward of the engine 29. The transmission 116 transfers torque from the transversely extending driven shaft 108 to the longitudinally extending front and rear driveshafts (not shown). The transmission 116 includes different gear sets, the combination of the gear sets being selected based on the position of the gear selector 40.

The front driveshaft passes through the engine 29 and connects to a secondary front driveshaft 122 via a universal joint 124. From the universal joint 124, the secondary front driveshaft 122 extends forwardly and toward the right of the SSV 10 to another universal joint 126. The universal joint 126 connects the secondary front driveshaft 122 to a differential 128. The differential 128 connects, via universal joints 130, to left and right drive axles 132. The drive axles 132 are connected to the front wheels 14 via universal joints 134.

The rear driveshaft connects to a secondary rear driveshaft 136 via a universal joint 138. From the universal joint 138, the secondary rear driveshaft 136 extends rearwardly and toward the left of the vehicle 10 to another universal joint 140. The universal joint 140 connects the secondary rear driveshaft 136 to a differential 142. The differential 142 connects, via universal joints 144, to left and right drive axles 146. The drive axles 146 are connected to the rear wheels 14 via universal joints 148.

Each of the front left and right suspensions 13A includes lower and upper A-arms 150, 152. The lower A-arm 150 is pivotally connected at one end to the front portion of the frame 12 and pivotally connected to a lower portion of a kingpin (not shown) at the other end. The front left wheel 14 is rotationally connected to the kingpin. The upper A-arm 152 is disposed above the lower A-arm 150. The upper A-arm 152 is pivotally connected at one end to the front portion of the frame 12 and pivotally connected to an upper portion of the kingpin at the other end. A shock absorber 154 is connected between the outer end of the upper A-arm 152 and the front portion of the frame 12. A sway bar 156, disposed rearwardly of the front suspensions 13A, is connected to both upper A-arms 152 to increase the roll stiffness of the suspensions 13A.

Each of the rear left and right suspensions 13B includes a swing arm 158 and a shock absorber 160. A tubular front end of the swing arm 158 is inserted over a shaft 162 defining a pivot axis 164 of the swing arm 158. From its front end, the swing arm 158 extends outwardly and rearwardly to the rear left wheel 14. The swing arm 158 has a plate 166 integrally formed therewith that extends rearwardly from a central portion of the swing arm 158. A lower end of the shock absorber 160 is connected to the plate 166. From the plate 166, the shock absorber 160 extends upwardly and forwardly to connect to the frame 12. A link 168 fixedly connects the swing arm 158 to a left end of a torsion bar 170. The torsion bar 170 is co-axial with the shaft 162. Since the other end of the torsion bar 170 is fixedly connected to the link 168 of the rear right suspension 13B, the torsion bar 170 increases the roll stiffness of the suspensions 13B.

Figure 4:
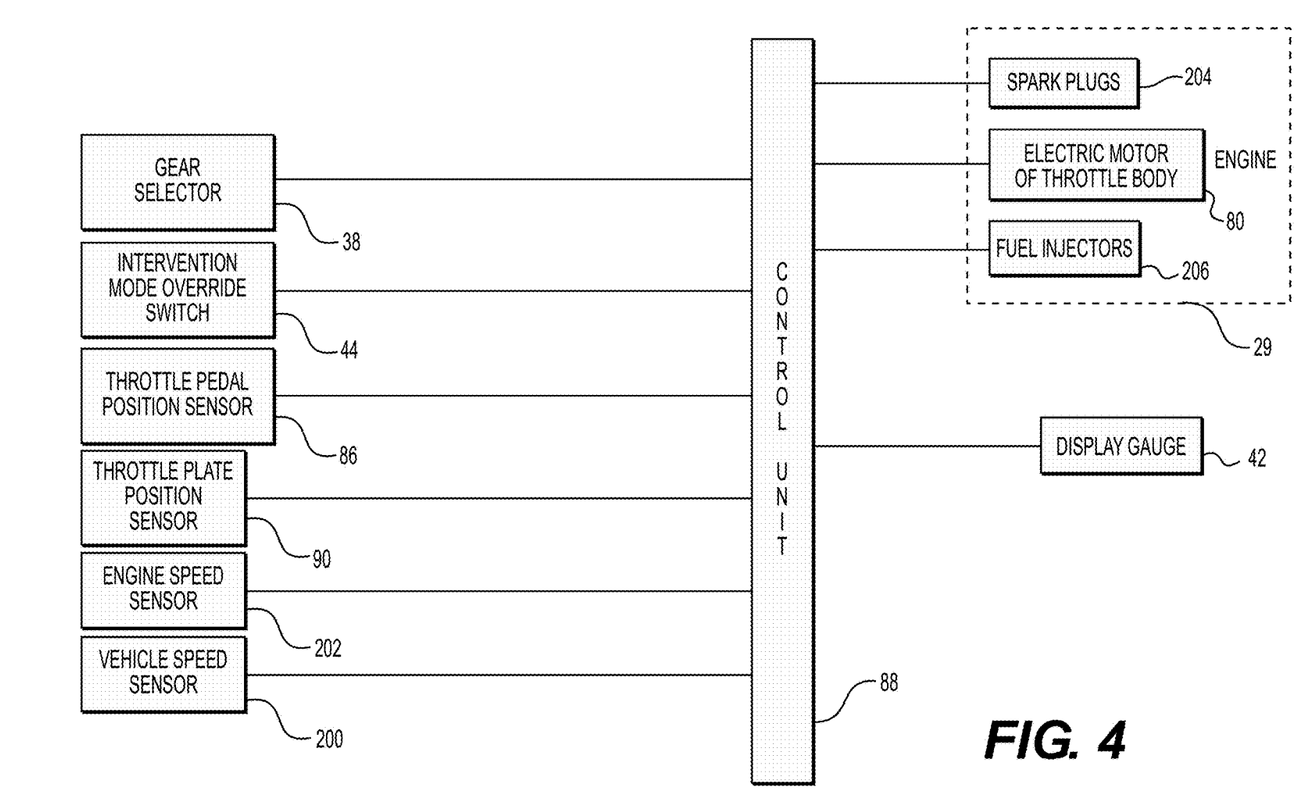
FIG. 4 is a schematic illustration of elements of a control system of the SSV of FIG. 1A.

Turning now to FIG. 4, elements of a control system of the SSV 10 will be described.

The SSV 10 has a vehicle speed sensor 200 connected to the control unit 88. The vehicle speed sensor 200 is a hall-effect sensor coupled to a trigger wheel on a driveshaft, such as the driveshafts 108, 122, or 136 so as to sense a rotation speed of the driveshaft 108. The vehicle speed sensor 200 transmits a vehicle speed signal based on the rotational speed of the driveshaft to the control unit 88. By knowing the diameter of the wheels 14, the control unit can determine a speed of the vehicle 10 and rotational speed of the driven pulley 112. It is contemplated that the vehicle speed sensor 200 could sense a speed of any shaft driven by the driven pulley 112 (i.e. any shaft connected between the driven pulley 112 and one of the wheels 14), including shafts inside the transmission 116, to determine the speed of the vehicle 10.

The SSV 10 also has an engine speed sensor 202 connected to the control unit 88. The engine speed sensor 202 is a hall-effect type sensor coupled to a trigger wheel on a crankshaft 106 of the engine 29. It is contemplated that the engine speed sensor 202 could be coupled to any rotating shaft of the engine 29 or connected between the engine 29 and the drive pulley 110, such as the camshaft (not shown). The engine speed sensor 202 transmits an engine speed signal based on this speed of rotation to the control unit 88. The control unit 88 determines the rotation speed of the drive pulley 110 and the engine torque based on the engine speed sensor signal.

As mentioned above, the control unit 88 receives a throttle pedal position signal from the throttle pedal position sensor 86 and a throttle plate position signal from the throttle plate position sensor 90.

The control unit 88 is connected to the gear selector 38 to receive a signal indicative of the gear currently selected.

The intervention override switch 44 is also connected to the control unit 88 and sends a signal to the control unit 88 when the switch 44 is actuated indicating the driver's preference to override the intervention mode operation of the engine 29 as will be discussed below.

Based at least in part on the signals received from the switches/sensors 38, 44, 86, 90, 200 and 202, the control unit 88 sends signals to the engine 29 for the intervention mode operation of the engine 29. The control unit 88 is connected to the spark plug 204 to control ignition of the fuel-air mixture in the combustion chamber of the engine 29. The control unit 88 is connected to the fuel injector 206 to control fuel injection into the engine 29. The control unit 88 is also connected to the electric motor 80 to control the position of the throttle plate 78 inside the throttle body 68 as mentioned above.

The control unit 88 is also connected to the display gauges 42 to control display of information thereon. The control unit 88 sends signals to the display gauges 42 to display information regarding engine and vehicle speed, and gear selection. The information displayed also includes instructions such as, for example instructing the driver to release the throttle pedal, or to switch to a lower gear when in the intervention mode.

It is contemplated that the control unit 88 could be separated into multiple units each having one or more of the functions described above and further below.

The SSV 10 has other features and components such as headlights and handles. As it is believed that these features and components would be readily recognized by one of ordinary skill in the art, further explanation and description of these components will not be provided herein.

As discussed above, in some situations, the belt 114 may slip with respect to the drive pulley 110. The energy accumulated by the belt 114 [heat generated] during the slipping during may even damage the belt 114.

Figure 5:
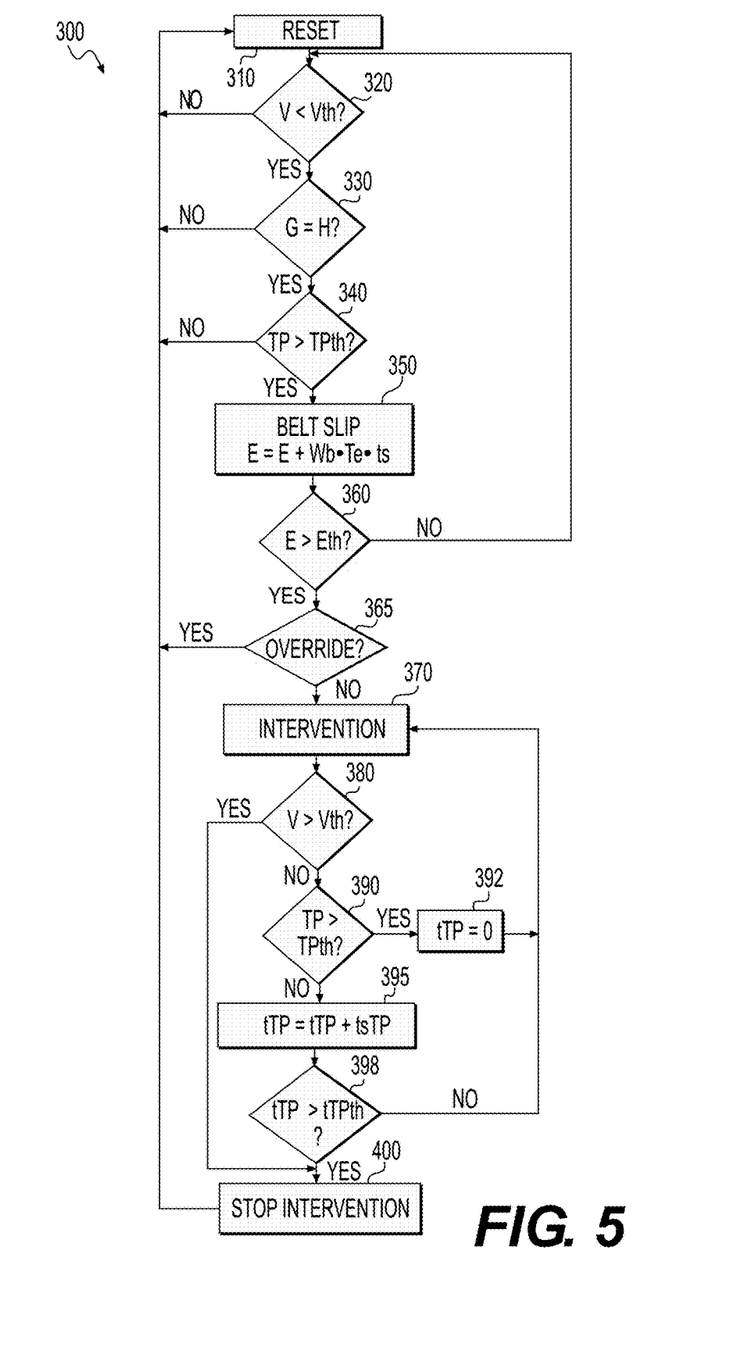
FIG. 5 is a logic diagram illustrating a method of limiting belt slip in a CVT of the power train of FIG. 2.

The following method 300, described with reference to FIG. 5, controls an operation of the engine 29 in order to limit the belt slipping of the belt 114 and to thereby prevent damage to the belt 114 and to visually and physically notify the driver of the intervention.

The method 300 is initiated at step 310 when the engine 29 is operating. At step 310, the control unit 88 resets to 0 an accumulated energy E, an accumulated energy time k, and a throttle pedal position time tTP to 0.

At step 320, the control unit 88 compares the vehicle speed V to the threshold vehicle speed Vth. Vth is preset, and based on the speed Vth above which the belt 114 is rotating sufficiently to dissipate the accumulated energy E over a large enough surface area such that the belt 114 will not be damaged at any one particular spot. If V>Vth, the method 300 returns to step 310. If V<Vth, the method 300 proceeds to step 330.

At step 330, the control unit 88 determines the gear selection requested by the driver of the SSV 10 based on the position G of the gear selector 38. If the gear selector 38 is set at H, or high gear, i.e. G=H, the method proceeds to step 340. If the gear selector 38 is not set to high gear, i.e. G≠H, the method returns to step 310.

At step 340, the control unit 88 compares the throttle pedal position TP to a threshold throttle pedal position TPth. If the throttle pedal position TP is at or higher than the threshold throttle pedal position TPth (i.e. TP≥TPth), the control unit 88 proceeds to step 340. If the throttle pedal position TP is lower than the threshold throttle position TPth (i.e. TP<TPth), the control unit 88 returns to step 310.

It is also contemplated that a rotational slip speed Wb of the belt 114 could be monitored and compared to a slip threshold speed to determine whether the belt 114 is slipping. The rotational slip speed Wb of the belt is the rotational speed difference between the drive pulley 112 and the belt 114 assuming that the diameter of the driven pulley 112 is close to its maximum diameter. The control unit 88 determines the slip speed Wb of the belt 114 from the difference between the drive pulley speed (determined from the engine speed sensor signal) and the driven pulley speed (determined from the vehicle speed sensor signal) assuming that the belt 114 rotates with the driven pulley 112.

At step 350, the method 300 determines the total energy accumulated E by the slipping belt 114 during a total time period t=0 to k as it moves against the drive pulley 110. The energy accumulated by the belt 114 during a time period equal to a sampling time interval ts is given by Wb*Te*ts where Wb is the rotational slip speed of the belt 114 and Te is the engine torque during the time interval ts. If the belt slip speed Wb and the engine torque Te vary during the sampling time ts, their respective average values for that time are used to determine the accumulated energy E. The total energy E accumulated by the belt 114 between t=0 and t=k is obtained by summing the energy E accumulated over each time interval ts during the time period t=0 to k. Thus, $$E(k)=E(k-1)+Wb*Te*ts$$

where E(k) is the total energy accumulated from time t=0 to k and E(k−1) is the total energy previously accumulated from t=0 to a time t=k−1. The average engine torque Te is determined from the engine speed sensor signal received from the engine speed sensor 202 and the throttle pedal position sensor 86.

At step 360, the total accumulated energy E(k) is compared with a threshold energy Eth. The threshold energy Eth is preset based on several factors such as, but limited to the material and dimensions of belt 114 used. When the energy E(k) accumulated by the belt 114 is greater than Eth, there is an increased risk of damage to the slipping belt 114 due to spotting. It is therefore desirable to limit or stop belt slipping when the energy accumulated reaches this threshold energy. Thus at step 360, if the accumulated energy E(k) ≥Eth, the method 300 proceeds to step 365. If the accumulated energy E(k)<Eth, the method 300 returns to step 320.

In step 365, the control unit 88 determines if the intervention override switch 44 has been activated by the driver of the SSV 10. If the switch 44 has been actuated, the method 300 returns to step 310. If the intervention override switch has not been activated, the method proceeds to step 370 to begin the intervention mode operation.

At step 370, the control unit 88 initiates operation of the engine 29 in an intervention mode which will be described below in further detail. During intervention mode operation, the control unit 88 sends signals to at least one of the spark plugs 204, electric motor 80, and the fuel injector 206 for controlling their operation as discussed below.

The control unit 88 continues intervention mode operation of the engine 29 as long as the vehicle speed V remains below a vehicle speed intervention threshold Vith and the throttle pedal position TP remains above a throttle pedal intervention threshold TPith. In the illustrated embodiment of the method 300, Vith and TPith are the same as the vehicle speed threshold Vth of step 320 and throttle pedal threshold TPth of step 340, i.e. Vth=Vith and TPth=TPith, but it is also contemplated that the thresholds for intervention mode operation Vith and TPith could be different, i.e. TPth≠TPith and Vth≠Vith. In the illustrated embodiment, TPith and TPth is at 5% of the maximum throttle pedal position, however, it is contemplated that it could be set at a different throttle pedal position based on factors such as the robustness of the belt 114 to heat, the maximum torque Te that can produced by the engine 29, the weight of the SSV 10, and the like.

After the intervention mode operation has been initiated in step 370, the method 300 continues to step 380, where the vehicle speed V is compared to the threshold vehicle speed Vth. If at step 380, the vehicle speed V is determined to have risen above the Vth, the method proceeds to step 400 where the intervention mode operation of the engine 29 is ended. An increase in the vehicle speed V indicates that the SSV 10 is moving and implies that the belt 114 is no longer slipping (or at least that the slipping of the belt 114 has at least decreased to a level which will not cause undesired damage to the belt 114) and that intervention mode operation for stopping the belt slipping is no longer needed. If the vehicle speed V remains less than Vth, the method proceeds to step 390.

At steps 390, 392, 395, 398 the control unit 88 determines whether the throttle pedal position TP has been decreased below TPth for at least a predetermined amount of time tTPth.

At step 390, the control unit 88 compares the throttle pedal position TP to TPth, the threshold throttle pedal position. If TP is greater than TPth, indicating that the driver is continuing to demand increased power from the engine 29, the method proceeds to step 392. At step 392, an intervention throttle pedal timer tTP is reset to 0, before the method 300 proceeds to step 370 to continue the intervention mode operation of the engine 29. If at step 390, TP is determined to be lower than TPth, the method proceeds to step 395, where the intervention throttle pedal timer tTP is updated by adding an increment of a throttle pedal sampling time interval tsTP.

At step 398, the updated intervention throttle pedal time tTP is compared to a threshold time tTPth. If tTP is determined to be greater than tTPth, (i.e. the throttle pedal position TP has remained lower than the throttle pedal position threshold TPth for at least a threshold period of time tTPth), the method 300 proceeds to step 400 to stop intervention mode operation. If tTP is less than tTPth, (i.e. the throttle pedal position is lower than the throttle pedal position threshold, TP<TPth, but not for at least a period of time tTPth), then the method proceeds to step 370 to continue intervention mode operation.

At step 400, the method 300 stops intervention mode operation of the engine. The method returns to step 310 where the control unit 88 resets the accumulated energy counter E(k) to 0.

It is contemplated that the intervention mode operation could be stopped as soon as TP<TPth. In this case, steps 392, 395 and 398 could be omitted, and the method 300 could proceed directly to step 400 if TP<TPth at step 390.

There is no additional step in the method 300 to stop the intervention mode operation if the gear selector 38 is placed into a low gear, since that would require the driver to let off the throttle pedal 40 to do so, which will also lower the throttle pedal position relative to the threshold throttle pedal position (i.e. TP<TPth).

Figure 6:
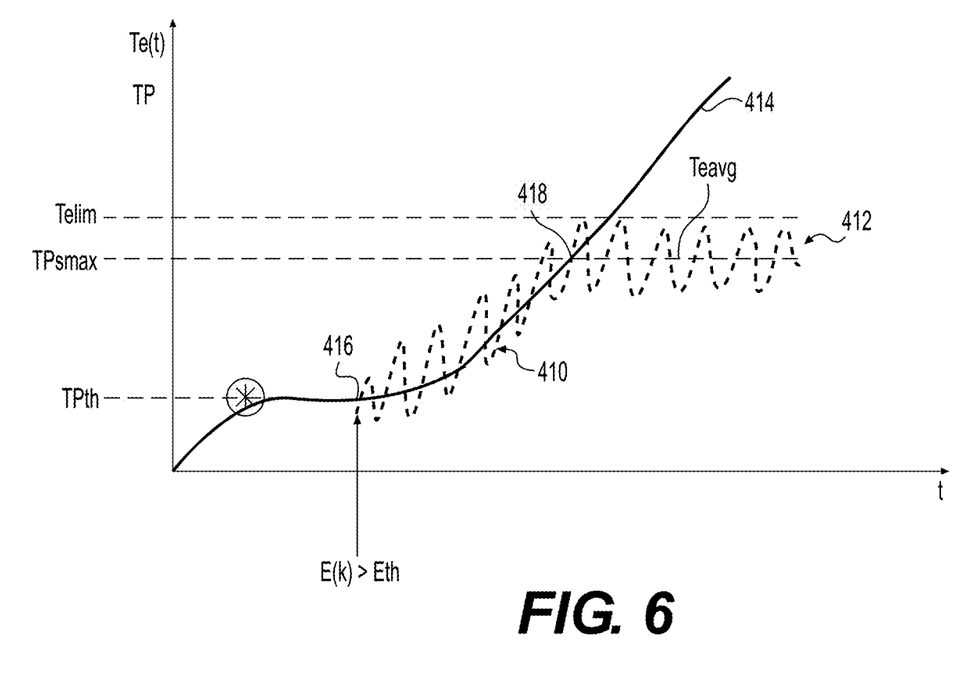
FIG. 6 is an illustration of the engine torque of the engine of FIG. 2, showing the engine torque controlled in an intervention mode and as a function of a throttle pedal position.

The intervention mode operation, will be discussed now with reference to FIG. 6. As mentioned above, the intervention mode operation is commenced at step 370, and discontinued at step 400.

During the intervention mode operation of the engine 29, the engine torque Te(k) produced by the engine 29 is controlled in order to limit or stop the slipping of the belt 114. The engine torque Te is cycled such that the SSV 10 rocks back and forth as a result of the oscillations of the engine. The engine torque Te is also controlled to limit its magnitude and/or its rate of increase.

In a first intervention stage 410, the engine torque Te is cycled commencing at 416 when the accumulated energy E increases above the threshold energy Eth. Engine torque Te is controlled to obtain low amplitude high frequency oscillations about an average engine torque Teavg (shown in dashed lines in FIG. 6). In this stage 410 of the intervention mode operation, the average engine torque Teavg continues to follow the the engine torque 414 demanded by the driver by means of the throttle pedal 40.

When the intervention mode operation starts, the driven pulley is almost stationary as the belt 114 is slipping with respect to the drive pulley 110, therefore failing to transmit sufficient torque to the driven pulley 112. During its oscillations about Teavg, the preferred reaction of the SSV 10 is to lurch forward under the increased torque Te and then to lurch backward under the lowered torque Te to create a rocking movement of the SSV 10 that is noticeable by the driver. Thus, as the engine torque Te is cycled about the average engine torque Teavg, the SSV 10 rocks back and forth periodically with the oscillating engine torque Te. Correspondingly, as the engine torque Te is cycled about the average engine torque Teavg, the driven pulley 112 and the belt 114 periodically rotate in a forward and rearward direction with the oscillating engine torque Te thereby increasing the surface area on which the energy E(k) is being dissipated.

The amplitude and frequency of oscillations of the engine torque Te are set, based on the weight of the SSV 10 and the performance characteristics of the engine 29, to obtain a certain amount of forward and backward movement of the SSV 10 simultaneously causing rotation of the driven pulley 112 by an amount depending on the transmission 116. In the illustrated embodiment, the amplitude and frequency of oscillations of the engine torque Te is set so that driven pulley 112 rotates about 1 turn forwards and backwards during each oscillation of the engine torque Te. This rotation of the driven pulley 112 makes the SSV 10 rock back and forth by about 6 inches in each direction, which is thus noticeable by the driver of the SSV 10.

The rocking motion of the SSV 10 thus serves to warn the driver that the belt 114 is slipping and the engine 29 is being operated in an intervention mode. Cycling of engine torque Te also prevents the belt 114 from being damaged due to belt spotting as the accumulated energy E is dissipated over a larger surface of the belt 114 due to the rocking motion of the SSV 10. When the SSV 10 rocks back and forth, the wheels 14 rotate forward and rearward. The driven pulley 112 and the belt 114 also rotate forward and rearward with the wheels 14. When the belt 114 rotates forward and rearward, the portion of the belt 114 in contact with the drive pulley 110 changes, thus preventing all the energy E from being accumulated in the same location on the belt 114, and reducing the probability of belt spotting.

If the SSV 10 does not begin to move forward (i.e. V<Vth) after cycling of the engine torque Te has commenced, and if the driver of the SSV 10 continues to increase torque demand 414 by increasing the throttle pedal position TP, the control unit 88 begins the second stage of intervention 412 in order to prevent damage to the belt 110 from belt spotting. The second stage of intervention 412 is commenced at 418 when the throttle pedal position TP is increased at 418 past a maximum slipping throttle position TPsmax, i.e. when TP>TPsmax.

In the second intervention stage 412, the engine torque Te is continued to be cycled while the average engine torque Teavg is limited. The rate of increase of the average engine torque Teavg is limited to be lower than that of the demanded throttle 414 (i.e. the throttle pedal position TP). In the illustrated embodiment, the instantaneous engine torque Te is also limited to be less than a value Telim which is less than the maximum possible engine torque Te that the engine 20 can produce.

The average engine torque Teavg, which is less than the maximum limited engine torque Telim, is equal to TPsmax. It is contemplated that the engine torque Te could be controlled such that the maximum limited engine torque Telim is equal to the maximum slipping throttle position TPsmax. In the illustrated embodiment, TPsmax is set at 50% of the maximum throttle pedal position TP. It is contemplated however, that TPsmax could be set at a different throttle pedal position TP based on factors such as the robustness of the belt 114 to heat, the maximum torque Te that can be produced by the engine 29, the weight of the SSV 10, and the like.

It is contemplated that engine torque Te is controlled to limit only the rate of increase of the average engine torque 417 and not the instantaneous engine torque Te. It is also contemplated that in the second intervention stage 412, the engine torque Te is not cycled.

The engine torque Te is controlled by adjusting at least one of the following: ignition timing, fuel injection, and air intake into the engine 29. As mentioned above, the control unit 88 controls ignition timing by sending a signal to the spark plugs 204. The control unit 88 control fuel intake by sending another signal to the fuel injectors 206 to control the fuel injection. As also mentioned above, the control unit 88 controls the air intake into the engine 29 by sending a signal to the electric motor 80 to adjust an opening of the throttle plate 78 of the throttle body 68.

It is known that in some configurations, that the engine torque Te responds faster to adjustment of the ignition timing than to variations in the fuel injection or the air intake. Therefore in the embodiment illustrated, cycling the engine torque Te is achieved by cycling the ignition timing by controlling the spark plugs 204.

In the embodiment illustrated, the engine torque Te is limited by adjusting the position of the throttle plate 78 in the throttle body 68 which admits air into the engine 29. It is contemplated that the control unit 88 could use any of the above-mentioned adjustments individually or simultaneously to cycle or limit the engine torque Te during the intervention mode operation of the engine 29. It is also contemplated that other suitable parameters could be used to cycle or limit the engine torque Te.

Additionally, during intervention mode operation of the engine 29, the control unit 88 sends a signal to the display 42 causing an appropriate warning to be displayed thereon for the driver of the SSV 10. The warning could notify the driver that the belt 114 is slipping, or in danger of being damaged. The warning could be in the form of a warning message, icon or light indicator. The warning could additionally include a sound or alarm. It is contemplated that the display 42 could also provide explicit instructions to the driver of the SSV 10 regarding the recommended course of action for reducing or ending slipping of the belt 114, for example, the instructions to the driver could be to switch to a lower gear.

The driver could stop intervention mode operation in several different ways. The driver could release the throttle pedal 40 for more than a predetermined time, tTPth, for example, 5 seconds. The driver could place the SSV 10 in a low gear using the gear selector handle 38. The driver could also override the intervention by actuating an override switch 44 provided on the SSV 10. While the switch 44 is actuated, the engine 29 will not be operated in the intervention mode but as soon as the switch 44 is released and if the criteria for the intervention (V<Vth, TP>TPth, G=H, E>Eth) are satisfied, the intervention will once again be started.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of limiting belt slip in a continuously variable transmission (CVT) of a vehicle, the CVT being operatively connected to an engine, the method comprising:
   determining a slip speed of a belt of the CVT;
   determining an accumulated energy of the belt based on the slip speed of the belt and an engine torque produced by the engine; and
   controlling the engine torque in an intervention mode when the accumulated energy is greater than a threshold energy,
   wherein controlling the engine torque in the intervention mode comprises controlling at least one of:
   cycling the engine torque; and
   limiting the engine torque.

2. The method of claim 1 further comprising:
   determining if the belt of the CVT is slipping with respect to a drive pulley of the CVT before determining the accumulated energy.

3. The method of claim 2, wherein the CVT belt is determined to be slipping if:
   a vehicle speed is less than a threshold vehicle speed;
   a transmission of the vehicle is configured to be in a high gear; and
   a throttle actuator of the vehicle is set in a throttle actuator position greater than a threshold throttle actuator position.

4. The method of claim 1, wherein the accumulated energy is set to zero if:
   a vehicle speed is greater than a threshold vehicle speed.

5. The method of claim 1, wherein the accumulated energy is set to zero if:
   a transmission of the vehicle is configured to be in a low gear.

6. The method of claim 1, wherein the accumulated energy is set to zero if:
   a throttle actuator of the vehicle is set in a throttle actuator position lower than a threshold throttle actuator position.

7. The method of claim 1, wherein controlling the engine torque in the intervention mode comprises controlling the engine torque based on a throttle actuator position set by a driver of the vehicle.

8. The method of claim 7, wherein controlling the engine torque in the intervention mode comprises:
   cycling the engine torque if the throttle actuator position set by the driver is greater than a first threshold throttle actuator position, the engine torque being cycled to oscillate with respect to an average engine torque, the average engine torque being based on the throttle actuator position; and
   limiting the engine torque if the throttle actuator position set by the driver is greater than a second threshold throttle actuator position, the second threshold throttle actuator position being greater than the first threshold throttle actuator position.

9. The method of claim 8 wherein:
the first threshold throttle actuator position is preset to be at a value of 5% of a maximum throttle actuator position.

10. The method of claim 8 wherein:
the second threshold throttle actuator position is preset to be at a value of 50% of a maximum throttle actuator position.

11. The method of claim 1, wherein controlling the engine torque in the intervention mode comprises:
cycling the engine torque so as to oscillate about a demanded torque, the amplitude of oscillations being adapted to produce rocking motion of the vehicle.

12. The method of claim 1, wherein a rate of increase of an average engine torque is reduced if a throttle actuator position is greater than a first threshold throttle actuator position.

13. The method of claim 1, wherein limiting the engine torque comprises at least one of:
limiting air intake into the engine; and
limiting fuel injection into the engine.

14. The method of claim 1, wherein cycling the engine torque comprises cycling an ignition timing of the engine.

15. The method of claim 1, wherein controlling the engine torque in the intervention mode further comprises displaying to a driver of the vehicle at least one of:
an indication of the CVT belt slipping; and
an instruction for making a gear change.

16. The method of claim 1, further comprising stopping controlling the engine torque in the intervention mode if:
a vehicle speed is greater than a threshold vehicle speed.

17. The method of claim 1, further comprising stopping controlling the engine torque in the intervention mode if:
a throttle actuator is set at a position below a threshold throttle actuator position.

18. The method of claim 1, further comprising stopping controlling the engine torque in the intervention mode if:
a throttle actuator is set at a position below a threshold throttle actuator position for a time period at least equal to a threshold throttle actuator time.

19. The method of claim 1, further comprising stopping controlling the engine torque in the intervention mode if:
an intervention override switch is actuated.

20. A method of limiting belt slip in a continuously variable transmission (CVT) of a vehicle, the CVT being operatively connected to an engine, the method comprising:
determining a slip speed of a belt of the CVT;
determining an accumulated energy of the belt based on the slip speed of the belt and an engine torque produced by the engine; and
controlling the engine torque in an intervention mode when the accumulated energy is greater than a threshold energy,
wherein controlling the engine torque in the intervention mode comprises:
cycling the engine torque if a throttle actuator position is set at a position greater than a first threshold throttle actuator position, the engine torque being cycled to oscillate with respect to an average engine torque, the average engine torque being based on the throttle actuator position; and
limiting the engine torque if the throttle actuator position is set at a position greater than a second threshold throttle actuator position, the second threshold throttle actuator position being greater than the first threshold throttle actuator position; and
stopping controlling the engine torque in the intervention mode if any one of the following conditions is satisfied:
a vehicle speed is greater than a threshold vehicle speed; and
the throttle actuator of the vehicle is set at a position lower than the first threshold throttle actuator position.

21. A vehicle comprising:
an engine supported by the frame, the engine comprising:
a throttle valve for controlling air intake into the engine,
a fuel injector for controlling fuel injection into the engine, and
a spark plug;
a control unit connected to the engine for controlling an engine torque produced by the engine;
a throttle actuator connected to the throttle valve and movable between a plurality of throttle actuator positions, the throttle actuator being connected to the control unit and sending to the control unit a throttle actuator position signal indicative of a position of the throttle actuator;
a driving shaft operatively connected to the engine;
a continuously variable transmission (CVT) comprising:
a drive pulley connected to the driving shaft and rotating therewith,
a driven pulley, and
a belt connecting the drive pulley and the driven pulley;
a driven shaft connected to driven pulley and rotating therewith;
a ground engaging member operatively connected to the driven shaft;
a transmission operatively connecting the CVT to the ground-engaging member via a plurality of gears;
a gear selector connected to the transmission for selecting one of the plurality of gears of the transmission, the gear selector being connected to the control unit and sending a gear selection signal thereto indicative of the selected gear;
a vehicle speed sensor sensing a rotational speed of one of: the driven pulley, the ground engaging member, and an element connected between the driven pulley and the ground engaging member, the vehicle speed sensor being connected to the control unit for sending a vehicle speed signal thereto indicative of a vehicle speed, the control unit determining the vehicle speed and a driven pulley speed based at least in part on the vehicle speed signal; and
an engine speed sensor sensing a rotational speed of one of: the engine, the drive pulley, and an element connected between the engine and the drive pulley, the engine speed sensor being connected to the control unit for sending an engine speed signal thereto indicative of an engine speed, the control unit determining the engine speed, an engine torque and a drive pulley speed based at least in part on the engine speed signal;
the control unit controlling the engine torque in an intervention mode when the belt of the CVT is slipping with respect to the drive pulley,
the control unit controlling the engine torque in the intervention mode based on the engine speed signal, the vehicle speed signal, the throttle actuator position signal and the gear selection signal, the control unit controlling the engine torque in the intervention mode by cycling the engine torque so as to oscillate the engine torque about a demanded torque, an amplitude of engine torque oscillations being adapted to produce rocking motion of the vehicle,
the control unit controlling the engine torque in the intervention mode by performing at least one of:
cycling an ignition timing;
limiting air intake into the engine; and
limiting fuel injection into the engine, and
the control unit controlling the engine torque in the intervention mode by sending at least one of:
an ignition timing signal to the spark plug;
a throttle valve control signal to the throttle valve; and
a fuel injection control signal to the fuel injector.

* * * * *

UNITED STATES PATENT AND TRADEMARK OFFICE
CERTIFICATE OF CORRECTION

PATENT NO. : 9,541,013 B2  
APPLICATION NO. : 14/744801  
DATED : January 10, 2017  
INVENTOR(S) : Jean-Philippe Gauthier et al.

Page 1 of 1

It is certified that error appears in the above-identified patent and that said Letters Patent is hereby corrected as shown below:

In the Specification

Column 4, Line 20, "sending a engine" should read -- sending an engine --

In the Claims

Claim 21, Column 16, between Lines 11 and 12, should read -- a frame; --

Claim 21, Column 16, Line 33, "connected to driven" should read -- connected to the driven --

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*